United States Patent [19]
Dinbergs

[11] 3,758,577
[45] Sept. 11, 1973

[54] STABILIZATION OF DIMETHYLFORMAMIDE

[75] Inventor: Kornelius Dinbergs, North Royalton, Ohio

[73] Assignee: The B. F. Goodrich Company, New York, N.Y.

[22] Filed: Nov. 1, 1971

[21] Appl. No.: 194,512

[52] U.S. Cl. ............................. 260/561 R, 252/399
[51] Int. Cl. ......................................... C07c 103/00
[58] Field of Search ................................ 260/561 R

[56] References Cited
OTHER PUBLICATIONS
Kornblum et al., Journ. Amer. Chem. Soc., Vol. 78, pp. 4037–4039

Ross et al., Journ. Amer. Chem. Soc., Vol. 79, pp. 4155–4159

*Primary Examiner*—Lewis Gotts
*Assistant Examiner*—Ethel G. Love
*Attorney*—Albert C. Doxsey et al.

[57] ABSTRACT

Dimethylformamide having certain alkyl halide compounds dissolved therein has an extended storage life before use as a solvent for polymers and resins in the manufacture of films, fibers and coatings and as an analytical solvent and does not require treatment with acidic ion exchange resin before use.

2 Claims, No Drawings

STABILIZATION OF DIMETHYLFORMAMIDE

BACKGROUND OF THE INVENTION

Dimethylformamide (DMF), a colorless, high-boiling, polar solvent is completely miscible with water, ethers, alcohols, esters, and ketones. It has been accepted to be stable except in the presence of acidic and alkaline media which tend to accelerate hydrolysis of DMF. The solvent can be produced by reaction between methyl formate and dimethylamine or by reacting a solution of dimethylamine in methanol with carbon monoxide, under pressure at low temperatures, in the presence of dissolved alkali metal alcoholate such as sodium methylate. Any residual dimethylamine makes the material tend toward the basic side. Any formic acid impurity makes it tend toward the acidic side. These vagaries in the solvent are believed to result in the degradation of any polymer dissolved in the solvent with the result that polymer solutions, once made, must be quickly spun to fibers, polymer cements must be quickly coated on their substrate, and in laboratories polymer solution samples for viscosity and molecular weight measurements must be tested in a period of a few hours, or else made up from fresh polymer and solvent to give dependable results. This solvent has been widely employed as the solvent in the manufacture of films and fibers and as a booster solvent in coating, printing, and adhesive formulations. It has been used to dissolve a wide range of polymers including vinyls, urethanes, epoxy cellulose derivatives, urea-formaldehyde, polyacrylonitrile, polyamides, polyvinylidene cyanide and copolymers thereof.

In addition to the wide spectrum of manufacturing uses, dimethylformamide has been employed at the analytical level in research and process control laboratories in preparing solutions of polymers for analysis and test as in determination of polymer molecular weight by dilute solution viscosity (DSV), or osmometry and determination of polymer molecular weight distribution by gel permeation chromatography (GPC).

In the past it has been necessary to use polymer solutions of polyurea-polyurethanes intended for fiber spinning within a matter of a few days because the viscosity of the solutions increases with time. Gel formed in this manner clogs spinnerets and leaves undesirable spots in fibers or films. U.S. Pat. No. 3,484,404 attacks this problem by providing for the addition of certain betaine salts to solutions of polyester-polyurea polyurethanes in dimethylformamide.

In the recently developed art of manufacturing synthetic, poromeric films having moisture vapor transmission capability and other leather-like properties, wide use has been made of cements, either as solution or colloidal dispersions, of a wide range of polyesterurethane and polyetherurethane materials dissolved in dimethylformamide. U.S. Pat. Nos. 3,000,757; 3,100,721; and, 3,460,969 are among a number of patents which teach these methods. Cements of this type, as opposed to the above-mentioned fiber spinning solutions which tend to gel, tend to undergo a reverse effect to gelling. The polymer degrades to lower molecular weights and cement viscosity falls. This leads to failures in coating procedures designed to produce permeable films. The failures include non-uniformity of cell structure produced, pits and streaks in the film surface. Attempts have been made to find stabilizers for these coating cements.

In the laboratories in the past, when solutions of polymer in dimethylformamide were to be tested or analyzed, it was necessary to make a fresh polymer solution and evaluate it at once. Polymer solutions sitting on the shelf were found to degrade rapidly, that is, in a matter of a few hours, in molecular weight as indicated by a drop in DSV. It has heretofore been impossible to retain a shelf sample for retest at later date or even to prepare a sample for test one day and run the test on the next day with any degree of confidence because of this viscosity change. The viscosity drop has always been noted whether the dimethylformamide itself is fresh from the manufacturer, or, before use, is treated with ion-exchange resins and/or molecular sieves. Acidic ion exchange resin treatments of dimethylformamide before use have been more or less standard practice to neutralize basic impurities, such as amines, which are inherently present in the dimethylformamide. Treatment with basic ion exchange resins removes formic acid and any other acidic impurities. Treatment of dimethylformamide with ion-exchange resins is described in U.S. Pat. No. 2,942,027. It is also customary to run dimethylformamide over molecular sieves to reduce the water content to a minimum.

It would be desirable to be able to combine dimethylformamide with a "one-shot" chemical stabilizer that will not degrade polymers dissolved therein. Such an additive would also make it unnecessary to go to the expense and labor of treating the solvent with ion-exchange resins before use.

SUMMARY OF THE INVENTION

A chemical stabilizer for dimethylformamide has been discovered. When it is combined with dimethylformamide in the range of 0.01 to 5.0 parts per 100 parts solvent, the result is that dimethylformamide dissolves any of the wide variety of polymers which it has been known to dissolve in the prior art and these polymer solutions then have a greatly increased aging life as measured by degradation of polymer viscosity. The stabilized dimethylformamide does not have to be treated with ion-exchange resins to remove acidic and basic impurities before use. The dimethylformamide can be stored for considerable periods before it is used. When polymer solutions are made up in this stabilized dimethylformamide, the solutions have long term stability and are more versatile and useful in the performance of laboratory analyses and in the manufacturing processes such as fiber spinning and cement coating of substrates. In addition, laboratory analytical procedures involving DMF solutions of polymeric materials are released from the urgency to run the test in a few hours before the sample degrades.

The halogen-containing stabilizers of this invention have the structure

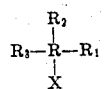

wherein R is a saturated aliphatic hydrocarbon chain containing from one to six carbon atoms; or an aliphatic hydrocarbon chain containing two to six carbon atoms and having a terminal double bond. $R_1$, $R_2$ and $R_3$ are hydrogen or an alkyl group containing from one to four carbon atoms, and X is halogen selected from the group consisting of chlorine, bromine and iodine. The preferred halogen-containing stabilizing compounds are the alkyl halides, such as methyl bromide, methyl iodide, ethyl bromide, ethyl iodide, n-propyl bromide, n-propyl iodide, n-butyl bromide, 2-bromobutane, 2-bromo-2-methyl butane, 2-chloro-2-methyl-butane and the like; the allyl halides, such as allyl bromide, allyl chloride, allyl iodide, methallyl chloride, methallyl bromide, methallyl iodide and the like; the alkyl dihalides, such as 1-chloro-2-bromoethane, 1-chloro-2-bromopropane, 1,3-dibromopropane, 1-bromo-3-chloropropane, 1,4-dibromobutane and the like; the alkyl trihalides, such as ethylene tribromide, 1,2,3-tribromopropane and the like; and tetrahalides, such as carbon tetrabromide and the like.

These stabilizers may react through quaternary salt formation with the basic amines such as dimethylamine and thus prevent the DMF from becoming more basic with time.

Among the many polymers commonly analyzed and processed in dimethylformamide solution are polyurethanes formed by chain-extending the reaction product of at least one polyalkyleneether glycol and at least one diisocyanate with at least one compound having two active hydrogen atoms. A number of such polymers are described in U.S. Pat. Nos. 2,692,873 and 2,957,852.

Other polyurethanes which can be used in solution in dimethylformamide include those prepared by reacting one mole of polyester having a molecular weight of about 600 to 1200 with about 1.1 to 3.1 moles of diphenyl diisocyanate in the presence of about 0.1 to 2.1 moles of a glycol containing about four to 10 carbon atoms. Polyesterurethanes of this type are described in U.S. Pat. No. 2,871,218. Polyetherurethanes of this general class are described in U.S. Pat. No. 2,899,411.

Vinyl polymer soluble in dimethylformamide include polyvinyl chloride, polymethyl methacrylate, polyvinyl butyral, polyacrylonitrile and copolymers thereof.

Condensation polymers such as polyamides, polyesteramides and polyesters are soluble in dimethylformamide.

The particular polymer dissolved in DMF is not important to the practice of this invention. The DMF is stabilized before the polymer is dissolved therein. Stabilized DMF forms stable solutions of polymer.

DETAILED DESCRIPTION OF THE INVENTION

EXAMPLE I

An essentially linear polyesterurethane is prepared by following the teaching of U.S. Pat. No. 2,871,218. First 1000 g. (1.0 mole) of hydroxyl poly(tetramethylene adipate) molecular weight 1000, hydroxyl number 112, acid number 2.5 and 180 g. (2.0 moles) of butanediol-1,4 are mixed in a heated autoclave with stirring for 15 minutes at 10 mm. pressure at 100° – 105°C. Next 750 g. (3.0 moles) of diphenyl-methane-p,p'-diisocyanate are added and stirred for two minutes. The melt is poured into lubricated metal trays and held in an oven at 140°C. for three hours.

This polymer is non-crosslinked and is soluble at room temperature with stirring in dimethylformamide.

Dimethylformamide, purchased from a commercial source, is available. It has a basic apparent pH value of about 8 and a water content of about 200 ppm. This DMF is passed through a 7 foot column, 1½ inches I.D., packed with 4A molecular sieves at the rate of one-fourth pound of DMF per minute. The water content is reduced to 50 ppm as determined by a Karl Fischer analysis. Suspected basic impurities are dimethylamine, methylamine, ions of these amines, and various methylammonium-N-methylcarbamates. One gallon of this dimethylformamide is treated with 300 grams of ion exchange resin (the hydrogen form of an insoluble ion exchange resin of polysulfonic acid type, a sulfonated styrene/divinylbenzene polymer known as Amberlite IR-120). This treatment reduces basicity, expressed as dimethylamine, to nil.

Another gallon of the sieved commercial DMF is not treated with ion exchange resin, but is stabilized by the addition of 0.05 parts per 100 weight parts DMF of n-propyl iodide.

The polyesterurethane is dissolved in 50 ml volumes of these two DMF solvents at a concentration of 0.400 g/100 ml solvent with agitation in 4 oz. capped bottles. The polymer is not immediately soluble, that is, it has been observed that at least three hours is required to dissolve the polymer in this solvent. The sample is therefore agitated for four hours from the time polymer is placed in the solvent to insure complete solution. After four hours, the dilute solution viscosity (DSV) of the polymer is determined in an Ostwald type viscosimeter. Determinations of DSV are also made on these solutions at 25 to 50 hours with these results:

TABLE I

| Sample Age | DSV (0.400g/100 ml solvent) | |
|---|---|---|
| | DMF-resin treated | DMF + Propyl Iodide |
| 4 hours | 0.859 | 0.893 |
| 25 hours | 0.762 | 0.891 |
| 50 hours | 0.758 | 0.894 |

The lower DSV (0.859) obtained in the resin treated DMF indicates that the polymer has already begun to degrade in this solvent, even as the polymer was going into solution. passage of time to 25 hours and then to 50 hours results in even further degradation of this polymer.

The polymer dissolved in solvent stabilized with propyl iodide shows a higher initial DSV and, further, shows no change in DSV over the period of 50 hours. Thus, the polymer in propyl iodide stabilized DMF has not degraded. If a polymer solution of this stability were to be used for forming a film or coating, there would be no concern over cement degradation even if the plant were to run into a shutdown of up to 50 hours. In addition, since the DSV results in stabilized DMF show no change, even after 50 hours, the analyst is able to have confidence in his results, regardless of the age of the sample when tested. If the polymer were required to meet a minimum DSV specification of 0.800, then the results as run on the resin treated DMF indicate that the polymer was in specification when the sample was tested within four hours. If the sample stood 25 hours or longer, the test would indicate that the polymer was out of specification.

EXAMPLE 2

The propyl iodide treated solvent of Example 1 is aged for a period of 78 days. After this time, a solution of the polyesterurethane of Example I is prepared for DSV evaluation with these results:

TABLE 2

| Age of Poly- | | DMF + n- |

| mer Solution | propyl iodide |
|---|---|
| 5 hours | 0.886 |
| 49 hours | 0.902 |

Dimethyl formamide stabilized with the additives of the invention remains stable for over two months and when the linear polyesterurethane is dissolved therein the solution of polymer remains stable for at least two days. An analyst therefore can have confidence in his DSV results even on aged solutions. There need be no concern about the reliability of results run a day or so after a solution is prepared.

EXAMPLE 3

A sample of vinylidene cyanide/vinyl acetate copolymer 50/50 mole percent, prepared by the teaching of U.S. Pat. No. 2,615,866, is dissolved in DMF, which is n-propyl iodide stabilized, and DSV is determined as in Example 1.

TABLE 3

| Age of polymer solution | DSV (0.400 g/100 ml solvent) | |
|---|---|---|
| | DMF | DMF plus n-propyl iodide |
| 4 | 1.361 | 1.470 |
| 24 | 1.335 | 1.463 |
| 48 | 1.319 | 1.443 |
| 120 | 1.286 | 1.441 |

The superiority of DMF stabilized with n-propyl iodide over DMF dried with molecular sieves for preparing analytical solutions for polymer DSV determinations is apparent. Over 120 hours the polymer solution in unstabilized DMF loses 5.5 percent of its DSV value, while the comparable loss in n-propyl iodide stabilized DMF is only 1.9 percent. After 24 hours the superiority of the DMF stabilized according to the invention is even greater, percent DSV loss is only 0.48 percent.

What is claimed is:

1. The method of stabilizing dimethylformamide comprising adding to 100 parts by weight dimethylformamide from 0.01 to 0.05 parts by weight of a compound the formula

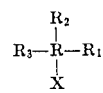

wherein R is a saturated aliphatic hydrocarbon chain containing from one to six carbon atoms, or an aliphatic hydrocarbon chain containing two to six carbon atoms and having a terminal double bond, $R_1$, $R_2$ and $R_3$ are selected from the class consisting of hydrogen, halogen or an alkyl group containing from one to four carbon atoms, and X is halogen selected from the group consisting of chlorine, bromine, and iodine.

2. The method of claim 1 wherein said compound is n-propyl iodide.

* * * * *